J. R. PETERS.
ROTARY-ENGINE.

No. 176,547.

Patented April 25, 1876.

WITNESSES:
C. Neveux
Alex F. Roberts

INVENTOR:
J. R. Peters
BY
ATTORNEYS.

UNITED STATES PATENT OFFICE.

JOHN R. PETERS, OF DOVER, NEW JERSEY.

IMPROVEMENT IN ROTARY ENGINES.

Specification forming part of Letters Patent No. 176,547, dated April 25, 1876; application filed February 14, 1876.

*To all whom it may concern:*

Be it known that I, JOHN R. PETERS, of Dover, in the county of Morris and State of New Jersey, have invented a new and Improved Rotary Engine, of which the following is a specification:

I am aware that grooved flanges attached to the ends of the hub and extending out as far as the range of the pistons (which are attached to steam-tight slides moving in the grooves by cams) have been used in this class of engines. I am also aware that plain flanges of about the same diameter as the hub and attached to it have been used in combination with stationary packing-rings pressing on the edges of the flanges and against the ends of the pistons; but my improvement consists of plain flanges attached to the hub and extending out as far as the pistons move, with stationary packing-rings pressing on the edges of the flanges and against the case, thus materially simplifying the construction of the first-named arrangement, preventing the radial end wear of the pistons by the packing-rings, as arranged in the second and preventing the loss of steam incident to both, through the necessary clearance between the inside edges of the circumference of the flanges and the case.

My invention also consists of compound pistons, consisting of two or more plates in each groove in the hub, the ends and tops of which may be so formed as to present serrated edges, and constitute with condensed steam what is called "water-packing," to prevent the live steam escaping past them.

Figure 1:
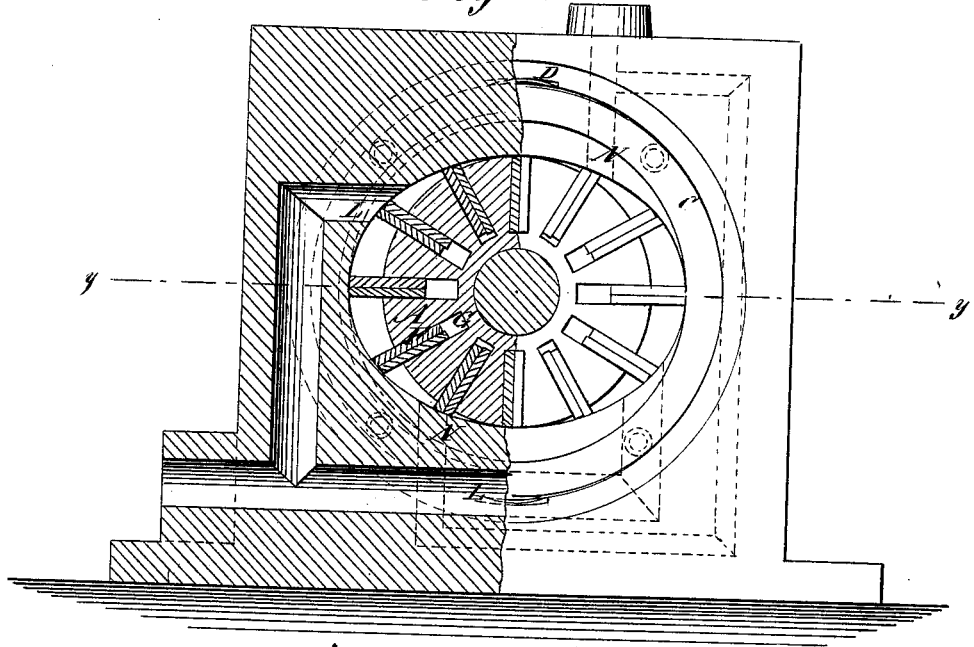
Figure 2:
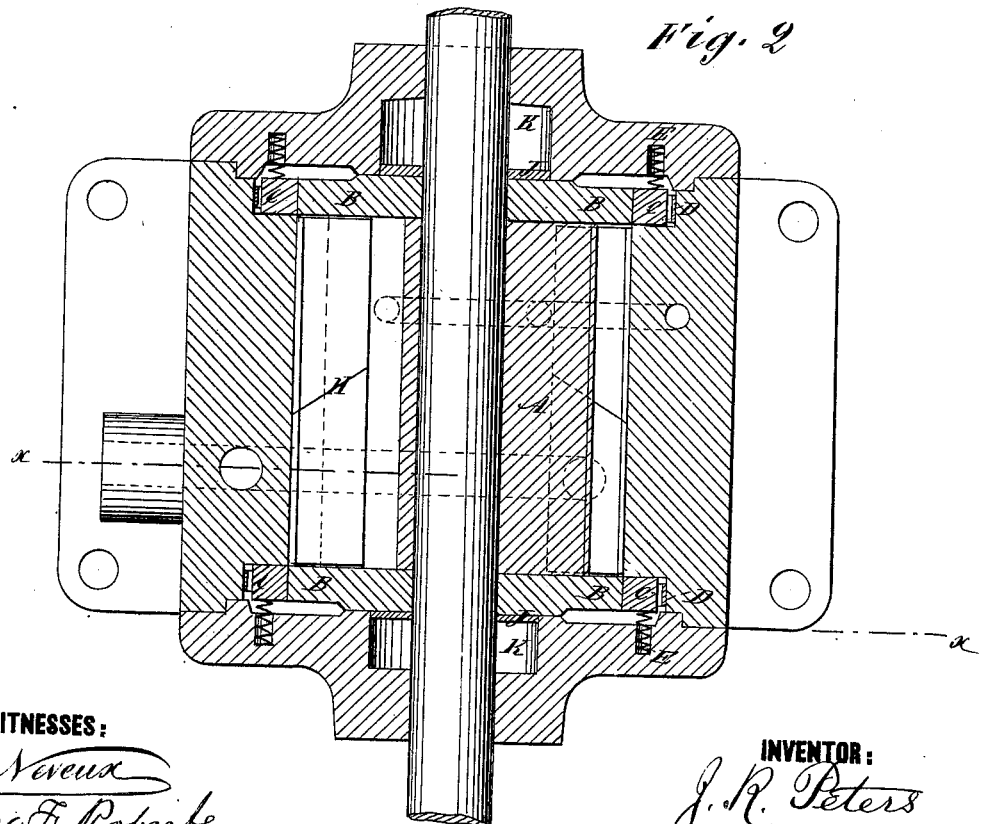

Figure 1 is partly a transverse section and partly an end elevation, with the end plate removed, taken on line $x\ x$, Fig. 2; and Fig. 2 is a horizontal section on line $y\ y$ of Fig. 1.

Similar letters of reference indicate corresponding parts.

A is the hub; B, the plain flanges, between which the pistons work; C, the packing-rings at the outer edge of the flanges, pressing on these edges by springs D, and against the case by springs E. F represents the compound pistons working in the radial grooves G of the hub. H is an oblique joint of the pistons, constructed in two parts for causing them to pack steam-tight against the flanges by the centrifugal force. J is a follower around the shaft inside of a chamber, K, to contain elastic packing to be pressed out by steam pressing on the follower, to avoid the use of stuffing-boxes. L represents the exhausts, and N the live-steam ports.

Having thus described my invention, what I claim as new, and desire to secure by Letters Patent, is—

1. The combination, in a rotary engine, of the stationary packing-rings C, and springs D and E with the casing, plain flanges B, hub A, and pistons H, said flanges extending out to the inner periphery of the casing, or as far as the pistons move, as and for the purpose set forth.

2. The compound pistons, consisting of two or more plates in each groove in the hub, the ends and tops of which may be formed to present serrated edges, and constitute with condensed steam what is called "water-packing," substantially as specified.

JOHN R. PETERS.

Witnesses:
A. P. THAYER,
JAMES H. HUNTER.